United States Patent [19]
Tanihara

[11] Patent Number: 6,046,131
[45] Date of Patent: Apr. 4, 2000

[54] METHOD FOR THE PREPARATION OF A CESIUM-SEPARATING SORBENT

[75] Inventor: Koichi Tanihara, Ogori, Japan

[73] Assignee: Japan as represented by Director General of Agency of Industrial Science and Technology, Japan

[21] Appl. No.: 09/136,044

[22] Filed: Aug. 18, 1998

[30] Foreign Application Priority Data

Sep. 4, 1997 [JP] Japan ................................. 9-257803

[51] Int. Cl.⁷ ............................. B01J 20/02; B01J 20/10; B01J 20/26
[52] U.S. Cl. ........................ 502/406; 502/402; 502/407
[58] Field of Search ................................. 502/406, 407, 502/402; 423/181

[56] References Cited

U.S. PATENT DOCUMENTS

| | | | |
|---|---|---|---|
| 4,158,626 | 6/1979 | Halpaap et al. | 210/31 |
| 4,192,764 | 3/1980 | Madsen | 430/455 |
| 4,448,711 | 5/1984 | Motojima et al. | 502/74 |
| 4,647,440 | 3/1987 | Blasius et al. | 423/181 |
| 4,725,534 | 2/1988 | Kagami et al. | 430/619 |
| 5,057,289 | 10/1991 | Issel et al. | 423/10 |
| 5,407,889 | 4/1995 | Remes | 502/400 |
| 5,456,840 | 10/1995 | Tucker et al. | 210/638 |
| 5,482,632 | 1/1996 | Lomasney et al. | 210/638 |
| 5,601,722 | 2/1997 | Tanihara . | |

FOREIGN PATENT DOCUMENTS

| | | |
|---|---|---|
| 0217143 | 8/1986 | European Pat. Off. . |
| 5-254828 | 10/1993 | Japan . |
| 9-173832 | 7/1997 | Japan . |

OTHER PUBLICATIONS

K. Terada et al., *Talanta*, 17, 955–963 (1970).
C. Konĕcný et al., *J. Radioanal. Chem.*, 14, 255–266 (1973).

*Primary Examiner*—Steven P. Griffin
*Assistant Examiner*—Cynthia M. Donley
*Attorney, Agent, or Firm*—Wenderoth, Lind & Ponack, L.L.P.

[57] ABSTRACT

The invention provides a method for the preparation of a sorbent capable of efficiently and selectively sorbing cesium ions from an aqueous solution. The method comprises impregnating the pores of a high-porosity carrier material such as silica gel and porous adsorbent resin with water-soluble potassium or sodium hexacyanoferrate (II) and contacting the carrier material with a solution of a copper salt in a solvent in which the water-soluble hexacyanoferrate (II) is hardly soluble such as ethyl alcohol to convert the water-soluble hexacyanoferrate (II) into water-insoluble copper hexacyanoferrate (II). The cesium ions sorbed on the sorbent can be readily desorbed and the sorbent can readily be regenerated. Alternatively, the carrier material is impregnated with a water-soluble hexacyanoferrate (III) which is converted into copper hexacyanoferrate (III) followed by a reducing reaction of the same into copper hexacyanoferrate (II).

16 Claims, No Drawings

METHOD FOR THE PREPARATION OF A CESIUM-SEPARATING SORBENT

BACKGROUND OF THE INVENTION

The present invention relates to a method for the preparation of a cesium-separating sorbent having high sorbing activity of cesium ions.

It is a very important technology to separate and recover cesium values from a waste solution. For example, waste solutions discharged out of various atomic power-related facilities such as a plant for reprocessing of spent nuclear fuels contain, besides nitric acid and sodium nitrate as the principal ingredients, a substantial amount of radioactive cesium which must be separated and recovered from the waste solution. Beverages such as cow's milk and the like contaminated with radioactive cesium must be decontaminated from the radioactive cesium. Spent geothermal hot water sometimes contains cesium value which should desirably be recovered for utilization.

It is known in the prior art that water-insoluble hexacyanoferrates (II) of various kinds of transition metal elements serve as an ion exchanger of high cesium-selectivity but, due to the very strong sorbing ability thereof to cesium ions, desorption of once sorbed cesium ions from the sorbent can hardly take place so that they are not suitable for use by repeating sorption and desorption of and regeneration from cesium ions. Accordingly, these conventional hexacyanoferrates (II) are practically of low value. On the other hand, Japanese Patent No. 2021973 discloses a process for the separation and recovery of cesium value by repeatedly using a certain copper salt-based hexacyanoferrate (II) by utilizing the characteristic electron exchanging function of the crystal lattices thereof so that a possibility of developing a practically efficient cesium-separating sorbent has come into sight.

With an object to improve the efficiency of solid-liquid separation, on the other hand, attempts were made from early days to prepare a sorbent of cesium ions by utilizing a porous carrier capable of supporting water-insoluble hexacyanoferrates (II) of various kinds of transition metal elements having high cesium selectivity. The porous carrier body for this purpose is exemplified by macroporous ion exchange resins, macroporous adsorbent resins, silica gels and the like.

The above mentioned macroporous ion exchange resins are advantageous because the copper hexacyanoferrate (II) can be supported thereon with a relatively high efficiency by utilizing the ion exchange groups of the carrier resin but, on the other hand, are disadvantageous because, as is reported in Japanese Patent Kokai 7-308590, addition of copper ions, which result in generation of a secondary waste material, is required in the process of regeneration so as to suppress an unfavorable action due to the ion exchange groups of the resin.

With regard to the macroporous adsorbent resins having no ion exchange groups, Japanese Patent Kokai 9-173832 reports an attempt of a method in which a macroporous adsorbent resin is converted into a kind of anion exchange resins by supporting a high molecular weight quaternary ammonium ions to serve as a mediating agent so that the supporting yield of the copper hexacyanoferrate (II) can be improved. The cesium-separating sorbent obtained by this method has an advantage that regeneration thereof can be performed with an acidic solution of hydrazine nitrate and no metal salt need be used in the steps of sorption/desorption and regeneration while the maximum supported amount of the copper hexacyanoferrate (II) is only about 10% by weight because of the use of a quaternary ammonium salt of a high molecular weight.

The method of obtaining a silica gel supporting a transition metal salt of hexacyanoferrate (II) conventionally undertaken is, for example, that a silica gel is first impregnated with a water-soluble hexacyanoferrate (II) such as potassium hexacyanoferrate (II) and the like and then the silica gel is dipped in an aqueous solution of a transition metal salt so as to deposit the transition metal salt of hexacyanoferrate (II) within the pores of the silica gel, which method is referred to as the aqueous solution dipping method hereinafter. This method, however, has a defect in principle that, due to the large amount of precipitates which can hardly be recovered and reused in the aqueous medium containing the silica gel, only a relatively small portion of the hexacyanoferrate (II) is supported within the pores so that it is difficult to obtain a cesium-separating sorbent having a large supporting capacity of the hexacyanoferrate (II) (see, for example, Talanta, volume 17, page 955, 1970).

A method for overcoming this defect is reported in Journal of Radioanalytical Chemistry, volume 14, page 255, 1973, according to which the treatment with an aqueous solution of a transition metal salt is performed by using a solution of as high as possible concentration and the procedure to introduce the solution uniformly to avoid a moistened state is repeated with intervention of a step of drying treatment. This method, however, is defective due to the extreme complexity and troublesomeness not to be suitable for practical application. In this method, in addition, contacting is performed with an aqueous solution of a transition metal salt so that exudation of the water-soluble hexacyanoferrate (II) out of the pores cannot be completely prevented and the supporting yield thereof cannot be increased without simultaneous increase in the formation of precipitates in the vicinity of the outer surface and fine precipitates in a large amount are released in conducting washing with water. Such precipitates formed as a by-product can hardly be recovered and reused and discharged as a hardly disposable cyan-containing waste material to cause a problem of environmental pollution. Furthermore, recovery of excess of the copper salt after the treatment with an aqueous copper salt solution necessitates removal of the fine precipitates formed in a large amount as a by-product. Thus, these conventional aqueous solution dipping methods each have various problems so that no practically satisfactory method is known.

SUMMARY OF THE INVENTION

The present invention accordingly has an object, by overcoming the above described problems and disadvantages in the conventional method for the preparation of a cesium-separating sorbent of the prior art, to provide a novel method for the preparation of an improved cesium-separating sorbent having high sorbing ability to cesium ions by efficiently loading a water-insoluble copper hexacyanoferrate (II) within the pores of a high-porosity carrier having no ion exchangeable groups such as porous resins and silica gels.

Thus, the present invention provides, in the first aspect of the invention, a method for the preparation of a cesium-separating sorbent which comprises the steps of:

(a) impregnating the pores of a high-porosity carrier material with a water-soluble hexacyanoferrate (II); and (b) bringing the carrier material supporting the water-soluble hexacyanoferrate (II) into contact with a solution of a copper salt dissolved in a solvent in which the water-soluble hexacyanoferrate (II) is hardly soluble so as to deposit insoluble copper hexacyanoferrate (II) within the pores of the high-porosity carrier material.

Further, the present invention provides, in the second aspect of the invention, a method for the preparation of a cesium-separating sorbent which comprises the steps of:

(a) impregnating the pores of a high-porosity carrier material with a water-soluble hexacyanoferrate (III);

(b) bringing the carrier material supporting the hexacyanoferrate (III) into contact with a solution of a copper salt dissolved in a solvent in which the water-soluble hexacyanoferrate (III) is hardly soluble so as to deposit insoluble copper hexacyanoferrate (III) within the pores of the high-porosity carrier material; and (c) subjecting the insoluble copper hexacyanoferrate (III) deposited within the pores of the high-porosity carrier material to a reducing reaction so as to convert the insoluble copper hexacyanoferrate (III) into insoluble copper hexacyanoferrate (II).

DETAILED DESCRIPTION OF THE PREFERRED EMBODIMENTS

As is described above, the object of the invention is accomplished in two ways according to the first and second aspects of the invention, in which the pores of a high-porosity carrier material are first impregnated with a water-soluble hexacyanoferrate (II) or hexacyanoferrate (III) which is deposited within the pores and then converted into insoluble copper hexacyanoferrate (II) or copper hexacyanoferrate (III), respectively, by the reaction with copper ions by contacting with a copper salt solution followed, when a water-soluble hexacyanoferrate (III) is used in the first step, by a reducing reaction by which the copper hexacyanoferrate (III) is converted into copper hexacyanoferrate (II).

Though not particularly limitative, the high-porosity carrier material as the base body of the cesium-separating sorbent prepared according to the inventive method is required to be capable of being impregnated with a water-soluble hexacyanoferrate (II) or hexacyanoferrate (III) not by the ion-exchange sorption of the hexacyanoferrate (II) ions or hexacyanoferrate (III) ions. It is preferable that the high-porosity carrier material has a hydrophilicity of the surface with polarity to some extent as compared with those having no polarity to exhibit water repellency. Examples of high-porosity carrier materials to meet these requirements include silica gels, acrylic and methacrylic synthetic adsorbent resins and the like. The high-porosity carrier material used in the inventive method should preferably have a pore volume of at least 0.7 ml/g and a pore diameter in the range from 3 to 80 nm.

In the first step of the inventive method, the pores of the high-porosity carrier material are impregnated with a water-soluble hexacyanoferrate (II) or hexacyanoferrate (III). Examples of the water-soluble hexacyanoferrates (II) and (III) include potassium and sodium hexacyanoferrates (II) and potassium hexacyanoferrate (III).

The method for impregnating the pores of the high-porosity carrier material is as follows. In the first place, in step (a), the water-soluble hexacyanoferrate (II) or (III) is dissolved in water to give an aqueous solution in a concentration as high as possible approximating saturation, to which the high-porosity carrier material is added and agitated therein to absorb the solution so as to obtain a slightly moistened state of the surface appearance. A desirable surface condition of the carrier material can readily be detected by carefully watching to detect the moment when a sudden decrease takes place in the flowability behavior of the particle agglomerates under agitation. In the next place, the carrier material impregnated with the aqueous solution is subjected to a dehydration treatment so as to facilitate full infiltration of the copper salt solution into the pores of the carrier particles where the water-soluble hexacyanoferrate (II) or (III) is brought into contact with the solution in step (b) to follow. This dehydration treatment can be performed, for example, in the following manner.

Thus, the carrier material infiltrated with the aqueous solution of the water-soluble hexacyanoferrate (II) or (III) is washed with an organic solvent which is fully miscible with water in any proportions and in which the hexacyanoferrate is hardly soluble so as to instantaneously form and deposit fine crystals of the water-soluble hexacyanoferrate within the pores of the high-porosity carrier material followed by removal of the organic solvent by evaporation. Examples of the organic solvent suitable for this treatment include methyl alcohol, ethyl alcohol, acetone, tetrahydrofuran and the like. This dehydration treatment has an effect, in step (b), to facilitate infiltration of the copper salt solution through the pores so as to ensure efficient deposition of the copper hexacyanoferrate.

It should be noted that, in conducting the dehydration treatment, the above mentioned treatment with the water-miscible organic solvent such as an alcohol unnecessitates the conventional means to effect removal of water such as heating, pressure reduction, use of a dry atmospheric gas and the like accompanied by disadvantages that the water-soluble hexacyanoferrate is deposited within the pores in the form of crystalline particles of an increased particle size resulting in incomplete conversion of the deposited crystals of water-soluble hexacyanoferrate into insoluble copper hexacyanoferrate in the subsequent step of contacting with a copper salt solution.

As is described above, the impregnation treatment of the pores of the high-porosity carrier material with an aqueous solution of the water-soluble hexacyanoferrate is conducted to such an extent that the surface of the particles of the carrier material exhibits a slightly wetted appearance with the aqueous solution. This is because, when the treatment is conducted to such an extent that the particle surface is fully wetted with the aqueous solution leaving a free portion of the solution outside the particles, the excess volume of the solution is consumed in the treatment with the copper salt solution to form precipitates outside of the pores so that the yield of effective precipitates deposited within the pores is accordingly decreased. When an overly volume of the aqueous solution of a water-soluble hexacyanoferrate (II) or (III) is used in the impregnation treatment of the pores of the high-porosity carrier material, the carrier particles wetted with the aqueous solution are washed with an organic solvent fully miscible with water and having no dissolving power to the water-soluble hexacyanoferrate to effect a dehydration treatment so that the excess amount of the water-soluble salt is deposited in an emulsified state or in a sludgy state to be washed away with the organic solvent and recovered prior to step (b). By undertaking this means, formation of the by-product copper salt outside of the pores is greatly suppressed in the treatment with the copper salt solution along with an increased deposition yield of fine crystals of the water-soluble hexacyanoferrate inside of the pores of the carrier material.

In the next place, the high-porosity carrier material impregnated with the water-soluble hexacyanoferrate (II) or (III) within the pores is subjected to a contacting treatment with a solution of a copper salt dissolved in an organic solvent in which the water-soluble hexacyanoferrate (II) or (III) is hardly soluble. Examples of the organic solvent preferable for this purpose include methyl alcohol and ethyl alcohol as well as mixtures thereof. If necessary, these non-aqueous organic solvents can be admixed with water. The amount of the water, if added, should not exceed 50% by weight based on the total amount of the solvent mixture though dependent on the solubility of the water-soluble hexacyanoferrate (II) or (III), the volume of the solvent, kind of the copper salt and other factors. Examples of suitable copper salt include divalent copper salts such as anhydrous copper(II) chloride, copper(II) chloride trihydrate, copper (II) nitrate trihydrate and the like.

The concentration of the copper salt in the copper salt solution used in step (b) of the inventive method is not particularly limitative within a range from a very low concentration to the saturation concentration. The amount of the copper salt contained in the copper salt solution should preferably be sufficient to give at least 1.5 moles of the copper ions per mole of the water-soluble hexacyanoferrate (II) or (III) with which the high-porosity carrier material is impregnated. As a trend, use of a copper salt solution of a low copper concentration gives an insoluble copper hexacyanoferrate (II) rich in the content of the double salt-type hexacyanoferrate of the formula $A_2Cu_3[Fe(CN)_6]_2$, in which A is a monovalent cation. This type of hexacyanoferrate (II) is readily formed by reducing the insoluble copper hexacyanoferrate (III) under conditions described later. Needless to say, however, the concentration of the copper salt solution should not be unduly low and, for example, should be in the range from 0.1 to 1 mole/liter because the volume of the copper salt solution must be so large accordingly to affect the productivity of the method. Recycling of the excess amount of the copper salt and the solvent is equally easy even by the use of an excessively large volume of a copper salt solution of a high concentration because the amount of the by-product precipitates formed in the solution is very small.

The contacting treatment of the carrier material supporting the water-soluble hexacyanoferrate (II) or (III) with a copper salt solution is performed usually by adding the carrier material to the copper salt solution at room temperature and agitating or shaking the mixture for about 5 to 30 hours followed by a conventional procedure of solid-liquid separation such as decantation and filtration to recover the solution of the unreacted copper salt by separating from the carrier material supporting the insoluble copper hexacyanoferrate (II) or (III). Thereafter, the solid material separated from the solution is subjected to a heat treatment at a temperature of 60 to 80° C. and, after cooling, washed with water to give a composite of the carrier material supporting the insoluble copper hexacyanoferrate (II) or (III). The above mentioned heat treatment has an effect of increasing the supported amount of the hexacyanoferrate, especially, when the concentration of the copper salt solution used in step (b) is low.

When the water-soluble hexacyanoferrate used as the starting material is a hexacyanoferrate (II), the composite material obtained in step (b) supports the insoluble copper hexacyanoferrate (II) so that it can be used as such as a cesium-separating sorbent. When the water-soluble hexacyanoferrate used as the starting material is a hexacyanoferrate (III), the composite carrier material obtained in step (b) supports the insoluble copper hexacyanoferrate (III) which is subjected in step (c) to a reducing reaction to give a composite material impregnated with insoluble copper hexacyanoferrate (II) to be used as a cesium-separating sorbent.

The above mentioned reducing reaction is performed, for example, by the method in which the composite material of the high-porosity carrier impregnated with the insoluble copper hexacyanoferrate (III) is dipped in hydrazine nitrate or an aqueous nitric acid solution containing hydrazine nitrate and the mixture is agitated, usually, at room temperature for a length of time so that the copper hexacyanoferrate (III) is reduced to the copper hexacyanoferrate (II) to give a cesium-separating sorbent.

The cesium-separating sorbent obtained in the above described manner can be used as such for the separation of cesium ions. It is, however, advantageous that the cesium-separating sorbent as obtained is subjected to a pretreatment described below so that the cesium sorbing power of the sorbent can be greatly improved and the treatment for the sorption and desorption of cesium can be performed with almost no loss of the effective ingredients. Thus, the copper hexacyanoferrate (II) supported on the high-porosity carrier material is oxidized into copper hexacyanoferrate (III) by using an oxidizing agent such as an aqueous nitric acid solution containing nitrous acid followed by a reducing treatment by using a reducing agent such as an aqueous nitric acid solution containing hydrazine nitrate without addition of any copper salt. As a consequence of addition of no copper salt, the product formed by this treatment is almost completely in the double salt type of the formula $A^+_2Cu_3[Fe(CN)_6]^-_2$, in which $A^+$ is a monovalent cation so as to greatly increase the cesium sorbing power along with a great decrease in the leached quantities of the copper ions, hexacyanoferrate (II) ions and hexacyanoferrate (III) ions in the course of the sorption treatment and desorption treatment with almost no loss of the effective ingredients.

In the following, description is given of the procedures for the sorption and desorption treatments of cesium value by using the cesium-separating sorbent obtained by the inventive method as well as of the regeneration treatment of the cesium-separating sorbent after desorption.

In the first place, the cesium-separating sorbent is brought into contact with an aqueous solution containing cesium ions so that the cesium ions are sorbed on the cesium-separating sorbent. In the next place, the cesium-separating sorbent supporting the cesium ions sorbed thereon is subjected to an oxidizing treatment with an oxidizing agent such as an aqueous nitric acid solution containing nitrous acid so that the cesium ions are desorbed from the cesium-separating sorbent. Thereafter, the separating sorbent after desorption of the cesium ions can be regenerated by a reducing treatment with a reducing agent such as an aqueous nitric acid solution containing hydrazine nitrate without addition of any copper salts. As is mentioned above in connection with the reducing treatment in the pretreatment of the cesium-separating sorbent, the thus regenerated separating sorbent has a high sorption capacity and has an advantage that elution of copper ions, hexacyanoferrate (II) ions and hexacyanoferrate (III) ions therefrom is extremely small in the sorption and desorption treatments subsequently undertaken almost without loss of the effective ingredients.

As is described above, a cesium-separating sorbent having very high cesium-sorbing capacity can be prepared efficiently according to the inventive method from a high-porosity carrier material such as porous resins having no ion-exchangeable groups and silica gels by impregnating the pores thereof with insoluble copper hexacyanoferrate (II) in a high loading amount. The cesium-separating sorbent obtained by the inventive method is useful for the recovery of cesium value from a variety of radioactive waste solutions, decontamination of cow's milk and the like contaminated with radioactive cesium and recovery of cesium value from spent geothermal hot water.

In the following, the method of the present invention is illustrated in more detail by way of Examples, which, however, never limit the scope of the invention in any way. In the following Examples, several kinds of high-porosity carrier materials as characterized below were used.

(1) Macroporous acrylic adsorbent resin particles having a particle diameter of 250 to 850 μm, average pore diameter of 9 nm and pore volume of 1.14 ml/g (Amberlite XAD-7, a product by Rohm & Haas Co.), referred to as XAD-7 hereinafter (2) Spherical silica gel particles having a particle size of 30 to 100 mesh, average pore diameter of 7 nm and pore volume of 0.8 ml/g (MB-4B, a product by Fuji Silicia Chemical Co.), referred to as silica gel I hereinafter (3) Spherical silica gel particles having a particle size of 30 to 100 mesh, average pore diameter of 10 nm and pore volume of 1.10 ml/g (MB-5D, a product by Fuji Silicia Chemical Co.), referred to as silica gel II hereinafter (4) Spherical silica gel particles having a particle size of 30 to 100 mesh, average pore diameter of 30 nm and pore volume of 1.10 ml/g (MB-300A, a product by Fuji Silicia Chemical Co.), referred to as silica gel III hereinafter (5) Spherical silica gel particles having a particle size of 30 to 100 mesh, average pore diameter of 80 nm and pore volume of 1.10 ml/g (MB-800A, a product by Fuji Silicia Chemical Co.), referred to as silica gel IV hereinafter In the following description, the term of "composite yield" means the proportion of the water-soluble hexacyanoferrate (II) or (III) converted to the insoluble copper hexacyanoferrate and deposited in the pores of the carrier material by contacting with the copper salt solution to form the composite cesium-separating sorbent to the overall amount of the water-soluble hexacyanoferrate supported on the carrier material to impregnate the pores, the balance of the water-soluble hexacyanoferrate being converted into precipitates in the free liquid phase as the insoluble copper hexacyanoferrate in the treatment with the copper salt solution.

Further, the term of "supported amount of insoluble hexacyanoferrates (II)" on the high-porosity carrier material means, unless otherwise specified, the overall amount in g of potassium, copper and hexacyanoferrate (II) ions contained in g of the high-porosity carrier material on the dry basis.

EXAMPLE 1-1

A 2 g portion of the silica gel II after drying was taken in an Erlenmeyer flask with a ground glass stopper to which an aqueous solution of potassium hexacyanoferrate (II) in a concentration of 22.7% by weight was gradually added dropwise under shaking of the flask until the silica gel powder as a whole lost flowability with slight wetting on the surface of the particles. In the next place, a 20 ml portion of ethyl alcohol was added to the flask followed by shaking and then by solid-liquid separation by decantation to separate the silica gel particles from the liquid medium of ethyl alcohol containing particles of potassium hexacyanoferrate (II) precipitated and suspended therein which was distilled to recover 0.033 g of the potassium hexacyanoferrate (II) and ethyl alcohol. The silica gel particles separated from the liquid medium were dried by evaporating ethyl alcohol by heating under reduced pressure to give 2.584 g of dried composite silica gel particles supporting 29.5% by weight of potassium hexacyanoferrate (II) based on the amount of the silica gel particles.

In the next place, the composite silica gel particles were admixed with 20 ml of an ethyl alcohol solution containing copper(II) chloride in an amount 8 times by moles relative to the potassium hexacyanoferrate (II) contained in the composite silica gel particles and agitated by shaking for 24 hours at room temperature to cause the reaction between the potassium hexacyanoferrate (II) and copper(II) chloride. Since the reaction proceeded very rapidly, the silica gel particles turned dark reddish violet immediately after introduction of the copper salt solution while the liquid phase remained clear containing little amount of precipitates released therein even after 24 hours of shaking. After completion of 24 hours of shaking, the silica gel particles were collected by filtration without particular difficulties followed by a heat treatment at 60° C. for 6 hours to effect aging. After cooling to room temperature by standing, the silica gel particles were repeatedly washed with water by decantation until copper ions could no longer be detected in the washings followed by air drying at room temperature to give 2.542 g as dried of composite silica gel particles of which the supporting amount was 27.8% by weight based on the silica gel and the molar ratios of potassium to iron and copper to iron of 0.07 and 1.96, respectively. The composite yield was 98.4% indicating that the loss of each of the potassium hexacyanoferrate (II) and copper(II) chloride was negligibly small.

EXAMPLE 1-2

Two grams of the silica gel II after drying were impregnated with an aqueous solution of potassium hexacyanoferrate (II) in about the same manner as in Example 1-1 described above. In the next place, the silica gel particles impregnated with the aqueous solution were dried by heating at 70° C. to a constant weight followed by cooling by standing to give 2.621 g of composite silica gel particles supporting potassium hexacyanoferrate (II) in an amount of 31.0% by weight based on the amount of the silica gel. Thereafter, the composite silica gel particles were added to 20 ml of an ethyl alcohol solution of copper(II) chloride, of which the amount of copper(II) chloride was 7.3 times by moles relative to the potassium hexacyanoferrate (II) supported on the silica gel particles, and the mixture was shaken for 24 hours at room temperature to effect the reaction. The reaction proceeded very rapidly so that the silica gel particles turned dark reddish violet immediately after addition of the copper(II) chloride solution. The free liquid phase outside of the silica gel particles was considerably cloudy due to suspension of the precipitates formed by the reaction of the copper salt with the potassium hexacyanoferrate (II) deposited on the surface of the silica gel particles. After completion of the reaction, the silica gel particles were collected by filtration and subjected to a heat treatment at 60° C. for 6 hours to effect aging.

After cooling by standing, the silica gel particles were repeatedly washed with water by decantation. Dissolution of a substantial amount of unreacted potassium hexacyanoferrate (II) was noted in this washing treatment. Though not quite well understood, this phenomenon is presumably due to the fact that, in the process of drying of the silica gel particles impregnated with the aqueous solution of potassium hexacyanoferrate (II), relatively large crystallites of potassium hexacyanoferrate (II) were precipitated in the pores of the silica gel particles which were poorly reactive with the copper salt due to the relatively small surface area as compared with fine crystallites. After washing with water, the silica gel particles were air-dried at room temperature to give 2.366 g as dried of composite silica gel particles impregnated with insoluble copper hexacyanoferrate (II) of which the supporting amount was 20.5% by weight based on the amount of the silica gel and the molar ratios of potassium:iron and copper:iron were 0.47 and 1.76, respectively. The composite yield was 70.4% to be lower than in Example 1-1 described above indicating migration of a considerable portion of the potassium hexa-cyanoferrate (II) impregnating the silica gel particles out of the pores not to be effectively utilized.

COMPARATIVE EXAMPLE 1

A 2 g portion of the silica gel II as dried was impregnated with an aqueous solution of potassium hexacyanoferrate (II) under the same conditions as in Example 1-1 and then heated at 70° C. for drying into a constant weight followed by spontaneous cooling by standing to give 2.619 g of composite silica gel particles supporting potassium hexacyanoferrate (II) in an amount of 31.0% by weight based on the silica gel particles. Thereafter, the composite silica gel particles were added to 20 ml of an aqueous solution containing copper(II) chloride in an amount of 2.9 times by moles relative to the potassium hexacyanoferrate (II) supported on the silica gel particles and the mixture was shaken for 24 hours at room temperature to effect the reaction. The reaction proceeded so rapidly that the silica gel particles turned dark reddish violet immediately after addition of the copper salt solution along with formation of a large amount of precipitates in the free liquid phase outside the silica gel particles.

After completion of the reaction, the silica gel particles were collected by filtration, for which a quite long time was taken, and subjected to a heat treatment at 60° C. for 6 hours to effect aging. After cooling by standing, the silica gel particles were thoroughly washed with water by repeating decantation followed by air-drying at room temper-ature to give 2.228 g as dried of composite silica gel particles supporting insoluble copper hexacyanoferrate (II) in an amount of 13.1% by weight relative to the silica gel particles, of which the molar ratios of potassium:iron and copper:iron were 0.33 and 1.84, respectively. The composite yield was 43.0%.

Separately, the same procedure as above was repeated except that the aqueous copper(II) chloride solution contained the copper salt in an amount of 10.4 times by moles relative to the potassium hexacyanoferrate (II) supported on the silica gel particles to give 2.362 g as dried of composite silica gel particles supporting insoluble copper hexacyanoferrate (II) in an amount of 19.8% by weight relative to the silica gel particles, of which the molar ratios of potassium:iron and copper:iron were 0.36 and 1.82, respectively. The composite yield was 68.9%.

EXAMPLE 2

By using 2 g of the dried adsorbent resin XAD-7, 2.798 g of composite resin particles supporting potassium hexacyanoferrate (II) in an amount of 40.8% by weight relative to the resin particles were obtained in substantially the same manner as in Example 1. The amount of the potassium hexacyanoferrate (II) recovered by the treatment with ethyl alcohol was 0.002 g. In the next place, the composite resin particles were admixed with 20 ml of an ethyl alcohol solution containing copper(II) chloride in an amount of 13.8 times by moles relative to the amount of the potassium hexacyanoferrate (II) supported on the resin particles and the mixture was shaken at room temperature for 24 hours to effect the reaction. The reaction proceeded so rapidly that the resin particles turned dark reddish violet immediately after addition of the copper salt solution while the amount of precipitates formed in the free liquid phase outside of the resin particles was very small even after 24 hours of shaking. After completion of the reaction, the resin particles were collected by filtration followed by a heat treatment at 60° C. for 6 hours to effect aging. The resin particles could be filtered without difficulties. After cooling by standing, the resin particles were repeatedly washed with water by decantation until no copper ions could be detected in the washings followed by air-drying at room temperature to give 2.702 g as dried of composite resin particles supporting insoluble copper hexacyanoferrate (II) in a supporting amount of 37.9% by weight relative to the resin particles, of which the molar ratios of potassium:iron and copper:iron were 0 and 2.02, respectively. The composite yield was 99.8% substantially without loss of the potassium hexacyanoferrate (II).

COMPARATIVE EXAMPLE 2

A 2 g portion of particles of the adsorbent resin XAD-7 was soaked with an aqueous solution of potassium hexacyanoferrate (II) in substantially the same manner as in Example 2. The resin particles were then dried at 70° C. until a constant weight was obtained followed by spontaneous cooling to give 2.824 g of composite resin particles supporting 41.2% by weight of potassium hexacyanoferrate (II) relative to the amount of the resin particles. The composite resin particles were subsequently processed in the same manner as in Example 2 except that the copper(II) chloride solution added thereto in a volume of 20 ml was an aqueous solution instead of the ethyl alcohol solution.

Different from Example 2, precipitates were formed in a large amount in the free liquid phase outside of the resin particles. The final product obtained by air-drying had bulkiness about 50% larger than the product in Example 2. In order to investigate the reason for this bulkiness, the composite resin particles were examined under an optical stereomicroscope to find that, in contrast to the resin particles obtained in Example 2 of which each particle as a whole had been uniformly made a composite to the very core, the resin particle here obtained was found to have a core-and-shell structure with deposition of coating films on the core particles while the coating films were in a partly peeled state. When particles of the XAD-7 resin were used as the carrier, as is understood from this result, not only a large amount of precipitates were formed as a by-product in the free liquid phase outside but also deposition of the precipitates took place not within the pores of the resin particles but on the outer surface of the resin particles to be susceptible to peeling so that a sorbent material of good performance could not be obtained.

EXAMPLE 3

An aqueous solution of potassium hexacyanoferrate (II) was added dropwise to an Erlenmeyer flask with ground glass stopper containing 2 g of the silica gel II after drying under periodical shaking until the silica gel particles were wet as a whole. In the next place, a 20 ml portion of ethyl alcohol was added to the flask with shaking and the mixture was filtered through a wet-process vibration screen of 100 mesh to separate the free liquid portion which was milky by containing the potassium hexacyanoferrate (II) precipitated in ethyl alcohol. Further, the silica gel particles on the vibration screen were repeatedly washed each time with a 20 ml fresh portion of ethyl alcohol until the washing of ethyl alcohol was almost free from turbidity. The alcoholic liquid coming from the ethyl alcohol treatment and the washings with ethyl alcohol were combined and subjected to distillation to recover ethyl alcohol as the distillate and 0.243 g of potassium hexacyanoferrate (II) as the residue. The silica gel particles left on the screen were completely freed from ethyl alcohol by evaporation under reduced pressure to give 2.614 g of composite particles consisting of the silica gel particles and precipitates of potassium hexacyanoferrate (II) supported on the silica gel particles in an amount of 30.8% relative to the silica gel particles.

The composite silica gel particles impregnated with potassium hexacyanoferrate (II) were treated in the same manner as in Example 1 by the addition of 20 ml of an ethyl alcohol solution containing copper(II) chloride in an amount of 10.2 times by moles relative to the potassium hexacyanoferrate (II) supported on the silica gel particles to give 2.487 g of dried composite silica gel particles impregnated with insoluble hexacyanoferrates (II) in an amount of 24.3% by weight relative to the silica gel particles, of which the molar ratios of potassium:iron and copper:iron were 0 and 2.01, respectively. The composite yield was 94.7% indicating that the composite particles could be prepared almost without loss of copper(II) chloride and potassium hexacyanoferrate (II) even when the starting silica gel particles were soaked with an excessively large volume of a saturated aqueous solution of potassium hexacyanoferrate (II).

EXAMPLE 4

An aqueous solution of potassium hexacyanoferrate (II) was added dropwise to an Erlenmeyer flask with ground glass stopper containing 2 g of the adsorbent resin XAD-7 after drying under periodical shaking until the resin beads were wet as a whole. In the next place, a 20 ml portion of ethyl alcohol was added to the flask with shaking and the mixture was filtered through a wet-process vibration screen of 100 mesh to separate the free liquid portion which was milky by containing the potassium hexacyanoferrate (II) precipitated in ethyl alcohol. Further, the resin beads on the vibration screen were repeatedly washed each time with a 20 ml fresh portion of ethyl alcohol until the washing of ethyl alcohol was almost free from turbidity. The alcoholic liquid coming from the ethyl alcohol treatment and the washings with ethyl alcohol were combined and subjected to distillation to recover ethyl alcohol as the distillate and 0.111 g of potassium hexacyanoferrate (II) as the residue. The resin particles left on the screen were completely freed from ethyl alcohol by evaporation under reduced pressure to give 2.917 g of composite particles consisting of the resin particles and precipitates of potassium hexacyanoferrate (II) supported on the resin particles in an amount of 46.9% relative to the resin particles.

The composite resin particles impregnated with potassium hexacyanoferrate (II) were treated in the same manner as in Example 1 by the addition of 20 ml of an ethyl alcohol solution containing copper(II) chloride in an amount of 6.1 times by moles relative to the potassium hexacyanoferrate (II) supported on the resin particles to give 2.809 g of dried composite sorbent resin particles impregnated with insoluble hexacyanoferrates (II) in an amount of 43.4% by weight relative to the resin particles, of which the molar ratios of potassium:iron and copper:iron were 0 and 2.00, respectively. The composite yield was 99.9% indicating that the composite particles could be prepared almost without loss of copper(II) chloride and potassium hexacyanoferrate (II) even when the starting adsorbent resin beads were soaked with an excessively large volume of a saturated aqueous solution of potassium hexacyanoferrate (II).

EXAMPLES 5 to 7

The procedure for the preparation of composite silica gel particles in each of Examples 5, 6 and 7 was substantially the same as in Example 1 or 3 excepting for the replacement of the silica gel II with the same amount of the silica gels I, III and IV, respectively, to obtain 2.359 g, 2.594 g and 2.575 g, respectively, of the silica gel particles impregnated with potassium hexacyanoferrate (II) in an amount of 19.0%, 29.9% and 30.0%, respectively, by weight relative to the silica gel particles. The amount of the potassium hexacyanoferrate (II) recovered from the liquid phase was 0.2249 g, 0.008 g and 0.013 g, respectively. Thereafter the composite silica gel particles in each Example were processed in the same manner as in Example 1 by the addition of 20 ml of an ethyl alcohol solution containing copper(II) chloride in an amount of 11 to 20 times by moles relative to the potassium hexacyanoferrate (II) supported on the silica gel particles to obtain 2.308 g, 2.556 g and 2.519 g, respectively, of composite silica gel particles supporting 16.7%, 27.3% and 27.4%, respectively, by weight of insoluble hexacyanoferrates (II) relative to the silica gel particles, of which the molar ratio of potassium:iron was 0.09, 0.05 and 0.23, respectively, and the molar ratio of copper:iron was 1.95, 1.98 and 1.89, respectively. The composite yield in Examples 5, 6 and 7 was 95.2%, 98.6% and 98.5%, respectively.

The above described results support the conclusion that composite silica gel particles supporting a large amount of insoluble hexacyanoferrates (II) can be prepared even from silica gel particles of which the pore diameter can be as large as about 80 nm if the pore volume of the silica gel particles is about 1 ml/g or larger.

EXAMPLE 8

An aqueous solution of potassium hexacyanoferrate (III) was added dropwise to an Erlenmeyer flask with ground glass stopper containing 2 g of the silica gel I after drying under periodical shaking until the silica gel particles were wet as a whole. In the next place, a 20 ml portion of ethyl alcohol was added to the flask with shaking and the mixture was filtered through a vibration screen to separate the free liquid portion which was milky by containing the potassium hexacyanoferrate (III) precipitated in ethyl alcohol followed by washing of the composite silica gel particles with ethyl alcohol in the same manner as in Example 3. The milky alcoholic liquid was subjected to distillation to recover ethyl alcohol as the distillate and 0.2702 g of potassium hexacyanoferrate (III) as the residue. The silica gel particles left on the screen were completely freed from ethyl alcohol by evaporation under reduced pressure to give 2.412 g of composite particles consisting of the silica gel particles and precipitates of potassium hexacyanoferrate (III) supported on the silica gel particles in an amount of 14.1% by weight relative to the silica gel particles.

The composite silica gel particles impregnated with potassium hexacyanoferrate (III) were added to 20 ml of an ethyl alcohol solution containing copper(II) chloride in an amount of 2.3 times by moles relative to the potassium hexacyanoferrate (III) supported on the silica gel particles to effect the reaction under shaking for 24 hours at room temperature. The reaction proceeded so rapidly that the silica gel particles turned brown immediately after addition of the copper(II) chloride solution and only a very small amount of precipitates could be detected in the free liquid phase. The silica gel particles were collected by filtration without particular difficulties and subjected to aging by heating at 60° C. for 6 hours followed by cooling and thorough washing with water until no copper ions could be detected in the washings.

In the next place, the composite silica gel particles obtained above were added to 200 ml of an aqueous solution containing 0.015 mole/liter of hydrazine sulfate and 0.1 mole/liter of nitric acid and kept therein under agitation for 24 hours at room temperature to effect reduction of the hexacyanoferrate (III). Finally, the silica gel particles were collected by filtration and washed with water followed by air-drying at room temperature to give 2.196 g of dried composite silica gel particles impregnated with insoluble hexacyanoferrates (II) in an amount of 12.5% by weight relative to the silica gel particles as a total of Cu and $Fe(CN)_6$, of which the molar ratio of copper:iron was 1.63. The composite yield was 91.1%.

EXAMPLE 9

The same procedure as in Example 8 was repeated excepting for the replacement of the silica gel particles with the same amount of the adsorbent resin XAD-7 particles after drying to obtain 2.695 g of composite resin particles consisting of the adsorbent resin particles and precipitates of potassium hexacyanoferrate (III) supported thereon in an amount of 35.5% relative to the resin particles. The amount of potassium hexacyanoferrate (III) recovered from the free liquid phase in this procedure was 0.221 g. In the next place, the composite resin particles were added to 20 ml of an ethyl alcohol solution containing copper(II) nitrate trihydrate in an amount of 5.2 times by moles relative to the potassium hexacyanoferrate (III) supported on the resin particles and shaken for 24 hours at room temperature to effect the reaction. The reaction proceeded so rapidly that the resin particles turned brown immediately after addition of the copper salt solution but the amount of the precipitates formed in the liquid phase was very small even after 24 hours. After completion of the reaction, the resin particles were collected by filtration without particular difficulties followed by a heat treatment for 6 hours at 60° C. to effect aging. After cooling by standing, the composite resin particles were repeatedly washed with water by decantation until no copper ions could be detected in the washings.

In the next place, the thus obtained composite resin particles were added to 350 ml of an aqueous solution containing 0.015 mole/liter of hydrazine sulfate and 0.1 mole/liter of nitric acid and agitated therein for 24 hours at room temperature to effect the reducing reaction. Finally, the composite resin particles were collected by filtration, washed with water and air-dried at room temperature to give 2.661 g of composite resin particles supporting 33.4% by weight of insoluble hexacyanoferrates (II) as a total of Cu and $Fe(CN)_6$ relative to the adsorbent resin particles, of which the molar ratio of copper:iron was 1.52. The composite yield was 95.4%.

EXAMPLE 10

An aqueous solution of potassium hexacyanoferrate (II) was added dropwise to an Erlenmeyer flask with ground glass stopper containing 2 g of the silica gel II after drying under periodical shaking until the silica gel particles were wet as a whole. In the next place, a 20 ml portion of methyl alcohol was added to the flask with shaking and the mixture was filtered through a vibration screen as used in Example 3 to separate the free liquid portion which was milky by containing the potassium hexacyanoferrate (II) precipitated in methyl alcohol followed by washing of the composite silica gel particles with methyl alcohol. The milky alcoholic liquid was subjected to distillation to recover methyl alcohol as the distillate and 0.413 g of potassium hexacyanoferrate (II) as the residue. The silica gel particles left on the screen were completely freed from methyl alcohol by evaporation under reduced pressure to give 2.509 g of composite particles consisting of the silica gel particles and precipitates of potassium hexacyanoferrate (II) supported on the silica gel particles in an amount of 26.4% by weight relative to the silica gel particles.

The composite silica gel particles impregnated with potassium hexacyanoferrate (II) were added to 20 ml of a methyl alcohol solution containing copper(II) chloride in an amount of 12.1 times by moles relative to the potassium hexacyanoferrate (II) supported on the silica gel particles to effect the reaction under shaking for 24 hours at room temperature. The reaction proceeded so rapidly that the silica gel particles turned dark reddish violet immediately after addition of the copper(II) chloride solution and only a very small amount of precipitates could be detected in the free liquid phase even after 24 hours of shaking. After completion of the reaction, the silica gel particles were collected by filtration without particular difficulties and subjected to aging by heating at 60° C. for 6 hours followed by cooling by standing, thorough washing with water until no copper ions could be detected in the washings and air-drying at room temperature to give 2.424 g of dried composite particles supporting insoluble hexacyanoferrates (II) in an amount of 21.6% by weight relative to the silica gel particles, of which the molar ratios of potassium:iron and copper:iron were 0.05 and 1.98, respectively. The composite yield was 88.6%.

EXAMPLE 11

An aqueous solution of potassium hexacyanoferrate (II) was added dropwise to an Erlenmeyer flask with ground glass stopper containing 2 g of particles of the adsorbent resin XAD-7 after drying under periodical shaking until the resin particles were wet as a whole. In the next place, a 20 ml portion of methyl alcohol was added to the flask with shaking and the mixture was filtered through a wet-process vibration screen to separate the free liquid portion which was milky by containing the potassium hexacyanoferrate (II) precipitated in methyl alcohol followed by repetition of washing of the composite resin particles on the screen with methyl alcohol until the washings were only slightly turbid. The milky alcoholic liquid and the washings were combined and subjected to distillation to recover methyl alcohol as the distillate and 0.111 g of potassium hexacyanoferrate (II) as the residue. The resin particles left on the screen were completely freed from methyl alcohol by evaporation under reduced pressure to give 2.914 g of composite resin particles consisting of the resin particles and precipitates of potassium hexacyanoferrate (II) supported on the resin particles in an amount of 46.3% by weight relative to the resin particles.

The composite resin particles impregnated with potassium hexacyanoferrate (II) were added to 20 ml of a methyl alcohol solution containing copper(II) chloride in an amount of 3.0 times by moles relative to the potassium hexacyanoferrate (II) supported on the resin particles to effect the reaction in the same manner as in Example 1 to give 2.723 g of dried composite resin particles supporting insoluble hexacyanoferrates (II) in an amount of 38.4% by weight relative to the resin particles, of which the molar ratios of potassium:iron and copper:iron were 0.26 and 1.87, respectively. The composite yield was 91.2%.

EXAMPLE 12

By undertaking the same procedure as in Example 4, 2 g of particles of the adsorbent resin XAD-7 after drying were processed into 2.865 g of composite resin particles supporting 44.5% by weight of precipitates of potassium hexacyanoferrate (II) relative to the resin particles. The amount of potassium hexacyanoferrate (II) recovered by the ethyl alcohol treatment was 0.213 g. The thus obtained composite resin particles were added to 20 ml of an ethyl alcohol solution containing copper(II) nitrate trihydrate in an amount of 4.7 times by moles relative to the potassium hexacyanoferrate (II) supported on the resin particles and shaken therein for 24 hours at room temperature to effect the reaction. The reaction proceeded so rapidly that the composite resin particles turned reddish violet immediately after addition of the copper salt solution and the amount of precipitates formed in the free liquid phase was very small even after 24 hours of the reaction. After completion of the reaction, the resin particles were collected by filtration without particular difficulties followed by a heat treatment at 60° C. for 6 hours to effect aging. After cooling by standing, the resin particles were repeatedly washed with water by decantation until no copper ions could be detected in the washings followed by air-drying at room temperature to give 2.755 g of dried composite resin particles supporting insoluble hexacyanoferrates (II) in an amount of 40.6% by weight relative to the resin particles, of which the molar ratios of potassium:iron and copper:iron were 0.30 and 1.85, respectively. The composite yield was 97.6%.

EXAMPLE 13

By undertaking the same procedure as in Example 1, 2 g of particles of the silica gel II after drying were processed into 2.563 g of composite silica gel particles supporting 28.2% by weight of precipitates of potassium hexacyanoferrate (II) relative to the silica gel particles. The amount of potassium hexacyanoferrate (II) recovered by the ethyl alcohol treatment was 0.040 g. The thus obtained composite silica gel particles were added to 20 ml of a solution of copper(II) chloride in an amount of 8.4 times by moles relative to the potassium hexacyanoferrate (II) supported on the silica gel particles in a 80:20 by weight mixture of ethyl alcohol and water and shaken therein for 24 hours at room temperature to effect the reaction. The reaction proceeded so rapidly that the composite silica gel particles turned dark reddish violet immediately after addition of the copper salt solution and the amount of precipitates formed in the free liquid phase was very small even after 24 hours of the reaction.

After completion of the reaction, the silica gel particles were collected by filtration without particular difficulties followed by a heat treatment at 60° C. for 6 hours to effect aging. After cooling by standing, the silica gel particles were repeatedly washed with water by decantation until no copper ions could be detected in the washings followed by air-drying at room temperature to give 2.546 g of dried composite silica gel particles supporting insoluble hexacyanoferrates (II) in an amount of 25.3% by weight relative to the silica gel particles, of which the molar ratios of potassium:iron and copper:iron were 0.08 and 1.96, respectively. The composite yield was 98.1%. The results were substantially the same as in Example 1 even by the use of a copper salt solution of which the solvent contained water in a substantial proportion.

EXAMPLE 14-1

By undertaking the same procedure as in Example 4, 2 g of particles of the adsorbent resin XAD-7 after drying were processed into 2.867 g of composite resin particles supporting 44.3% by weight of precipitates of potassium hexacyanoferrate (II) relative to the resin particles. The amount of potassium hexacyanoferrate (II) recovered by the ethyl alcohol treatment was 0.152 g. The thus obtained composite resin particles were added to 20 ml of a solution of copper (II) nitrate trihydrate in an amount of 3.2 times by moles relative to the potassium hexacyanoferrate (II) supported on the resin particles in a 80:20 by weight mixture of ethyl alcohol and water and shaken therein for 24 hours at room temperature to effect the reaction. The reaction proceeded so rapidly that the composite resin particles turned reddish violet immediately after addition of the copper salt solution and the amount of precipitates formed in the free liquid phase was very small even after 24 hours of the reaction. After completion of the reaction, the resin particles were collected by filtration without particular difficulties followed by a heat treatment at 60° C. for 6 hours to effect aging. After cooling by standing, the resin particles were repeatedly washed with water by decantation until no copper ions could be detected in the washings followed by air-drying at room temperature to give 2.767 g of dried composite resin particles supporting insoluble hexacyanoferrates (II) in an amount of 41.2% by weight relative to the resin particles, of which the molar ratios of potassium:iron and copper:iron were 0.54 and 1.73, respectively. The composite yield was 99.3%. The results were substantially the same as in Example 4 even by the use of a copper salt solution of which the solvent contained 20% by weight of water.

EXAMPLE 14-2

By undertaking the same procedure as in Example 4, 2 g of particles of the adsorbent resin XAD-7 after drying were processed into 2.879 g of composite resin particles supporting 45.0% by weight of precipitates of potassium hexacyanoferrate (II) relative to the resin particles. The amount of potassium hexacyanoferrate (II) recovered by the ethyl alcohol treatment was 0.155 g. The thus obtained composite resin particles were added to 20 ml of a solution of copper (II) nitrate trihydrate in an amount of 3.1 times by moles relative to the potassium hexacyanoferrate (II) supported on the resin particles in a 50:50 by weight mixture of ethyl alcohol and water and shaken therein for 24 hours at room temperature to effect the reaction. The reaction proceeded so rapidly that the composite resin particles turned reddish violet immediately after addition of the copper salt solution and a small amount of precipitates were found in the free liquid phase.

After completion of the reaction, the same procedure as in Example 14-1 described above was undertaken to give 2.707 g of dried composite resin particles supporting insoluble hexacyanoferrates (II) in an amount of 38.3% by weight relative to the resin particles, of which the molar ratios of potassium:iron and copper:iron were 0.81 and 1.60, respectively. The composite yield was 88.3%. The results were substantially inferior as compared with the results in Example 14-1 presumably due to the use of a mixture of ethyl alcohol and water as the solvent of the copper salt in which the content of water was as high as 50% by weight.

EXAMPLE 15

By undertaking the same procedure as in Example 3, 2 g of the silica gel I after drying were processed into 2.397 g of composite silica gel particles supporting 19.9% by weight of precipitates of potassium hexacyanoferrate (II) relative to the silica gel particles. The amount of potassium hexacyanoferrate (II) recovered by the ethyl alcohol treatment was 0.198 g. The thus obtained composite silica gel particles were added to 20 ml of an ethyl alcohol solution of copper (II) chloride in an amount of 1.8 times by moles relative to the potassium hexacyanoferrate (II) supported on the silica gel particles and shaken therein for 24 hours at room temperature to effect the reaction. The reaction proceeded so rapidly that the composite silica gel particles turned dark reddish violet immediately after addition of the copper salt solution and the amount of precipitates formed in the free liquid phase was very small even after 24 hours of the reaction.

After completion of the reaction, the silica gel particles were collected by filtration without particular difficulties followed by a heat treatment at 60° C. for 6 hours to effect aging. After cooling by standing, the silica gel particles were repeatedly washed with water by decantation until no copper ions could be detected in the washings followed by air-drying at room temperature to give 2.341 g of dried composite silica gel particles supporting insoluble hexacyanoferrates (II) in an amount of 17.9% by weight relative to the silica gel particles, of which the molar ratios of potassium:iron and copper:iron were 0.54 and 1.73, respectively. The composite yield was 96.8%.

EXAMPLE 16

By undertaking the same procedure as in Example 4, 2 g of the adsorbent resin XAD-7 after drying were processed into 2.909 g of composite resin particles supporting 46.6% by weight of precipitates of potassium hexacyanoferrate (II) relative to the adsorbent resin particles. The amount of potassium hexacyanoferrate (II) recovered by the ethyl alcohol treatment was 0.120 g. The thus obtained composite resin particles were added to 20 ml of an ethyl alcohol solution of copper(II) chloride in an amount of 4.4 times by moles relative to the potassium hexacyanoferrate (II) supported on the resin particles and shaken therein for 24 hours at room temperature to effect the reaction. The reaction proceeded so rapidly that the composite resin particles turned reddish violet immediately after addition of the copper salt solution and the amount of the precipitates formed in the free liquid phase was very small even after 24 hours of the reaction.

After completion of the reaction, the composite resin particles were collected by filtration without particular difficulties followed by a heat treatment at 60° C. for 6 hours to effect aging. After cooling by standing, the composite resin particles were repeatedly washed with water by decantation until no copper ions could be detected in the washings followed by air-drying at room temperature to give 2.785 g of dried composite resin particles supporting insoluble hexacyanoferrates (II) in an amount of 42.4% by weight relative to the resin particles, of which the molar ratios of potassium:iron and copper:iron were 0.31 and 1.84, respectively. The composite yield was 99.6%.

EXAMPLE 17

By undertaking the same procedure as in Example 4, 2 g of the adsorbent resin XAD-7 after drying were processed into 2.863 g of composite resin particles supporting 44.1% by weight of precipitates of potassium hexacyanoferrate (II) relative to the adsorbent resin particles. The amount of potassium hexacyanoferrate (II) recovered by the ethyl alcohol treatment was 0.148 g. The thus obtained composite resin particles were added to 20 ml of an ethyl alcohol solution of copper(II) nitrate trihydrate in an amount of 3.2 times by moles relative to the potassium hexacyanoferrate (II) supported on the resin particles and shaken therein for 24 hours at room temperature to effect the reaction. The reaction proceeded so rapidly that the composite resin particles turned reddish violet immediately after addition of the copper salt solution and the amount of the precipitates formed in the free liquid phase was very small even after 24 hours of the reaction.

After completion of the reaction, the composite resin particles were collected by filtration without particular difficulties followed by a heat treatment at 60° C. for 6 hours to effect aging. After cooling by standing, the composite resin particles were repeatedly washed with water by decantation until no copper ions could be detected in the washings followed by air-drying at room temperature to give 2.757 g of dried composite resin particles supporting insoluble hexacyanoferrates (II) in an amount of 40.8% by weight relative to the resin particles, of which the molar ratios of potassium:iron and copper:iron were 0.64 and 1.68, respectively. The composite yield was 99.3%.

The above described results of Examples 15, 16 and 17 indicate that use of a copper salt solution of a relatively low concentration leads, as a trend, to the formation of a composite sorbent rich in the content of the copper hexacyanoferrate of the double salt type.

EXAMPLE 18

Into an Erlenmeyer flask with ground glass stopper were taken 2 g of the silica gel I after drying, to which an aqueous solution of sodium hexacyanoferrate (II) in a concentration of 16.0% by weight was added dropwise under periodical shaking until the silica gel particles as a whole were wet with the solution. Thereafter, the same procedure as in Example 3 was undertaken to obtain 2.253 g of composite silica gel particles supporting precipitates of sodium hexacyanoferrate (II) in an amount of 14.8% by weight relative to the silica gel particles. The amount of sodium hexacyanoferrate recovered by the ethyl alcohol treatment was 0.071 g. The thus obtained composite silica gel particles were added to 20 ml of an ethyl alcohol solution of copper(II) chloride in an amount of 2.0 times by moles relative to the sodium hexacyanoferrate (II) supported on the silica gel particles and shaken therein for 24 hours at room temperature to effect the reaction. The reaction proceeded so rapidly that the composite silica gel particles turned dark reddish violet immediately after addition of the copper salt solution and the amount of the precipitates formed in the free liquid phase was very small even after 24 hours of the reaction.

After completion of the reaction, the composite silica gel particles were collected by filtration without particular difficulties followed by a heat treatment at 60° C. for 6 hours to effect aging. After cooling by standing, the composite silica gel particles were repeatedly washed with water by decantation until no copper ions could be detected in the washings followed by air-drying at room temperature to give 2.295 g of dried composite silica gel particles supporting insoluble hexacyanoferrate (II) in an amount of 15.9% by weight relative to the silica gel particles, of which the molar ratios of sodium:iron and copper:iron were 0.54 and 1.73, respectively. The composite yield was 94.9%.

APPLICATION EXAMPLE 1

Into an Erlenmeyer flask was taken 0.145 g of the composite silica gel particles prepared in Example 5 as dried, to which 10 ml of water were added and deaerated under reduced pressure by using a water jet aspirator until cease of bubble rising so as to accommodate the particles with water. Thereafter, the mixture was subjected to solid-liquid separation by filtration under reduced pressure through a membrane filter of poly(tetrafluoroethylene) resin mounted on a membrane holder of 25 mm diameter and 15 ml capacity. The composite silica gel particles on the membrane filter were completely washed down and transferred into an Erlenmeyer flask and the membrane holder was washed by using 10 ml of an aqueous solution containing $10^{-3}$ mole/liter of hydrazine nitrate, $2 \times 10^{-3}$ mole/liter of cesium nitrate and 3 moles/liter of nitric acid and the mixture in the flask was shaken for 1 hour to effect sorption of cesium ions on the silica gel particles followed by filtration under reduced pressure. The silica gel particles as thoroughly washed with water on the filter were completely washed down and transferred to another Erlenmeyer flask and the membrane filter was washed with 10 ml of an aqueous solution containing $10^{-3}$ mole/liter of sodium nitrite and 5 moles/liter of nitric acid and the mixture in the flask was shaken for 24 hours to effect desorption of the cesium ions from the silica gel particles. The filtrate and the washings were analyzed to find that 65.8% of the cesium ions in the aqueous solution were sorbed excepting the portion lost by washing with water and 92.31% of the cesium ions were desorbed from the silica gel particles including the portion transferred into the water washings. The concentrations of iron and copper in the treatment solution after the adsorption treatment were 0.43 ppm and 29.6 ppm, respectively, and the concentrations of iron and copper in the treatment solution after the desorption treatment were 1.43 ppm and 82.4 ppm, respectively.

In the next place, regeneration of the silica gel particles was undertaken by adding 10 ml of an aqueous solution containing $1.5 \times 10^{-2}$ mole/liter of hydrazine nitrate and 0.1 mole/liter of nitric acid into the membrane holder of the membrane filter with the lower end of the funnel leg stoppered in order to prevent running down of the solution. After about 1 hour of standing, the silica gel particles in the membrane holder were periodically agitated until cease of bubble rising followed by standing for further 30 minutes and filtration. The treatment solution after this regeneration treatment contained iron and copper in concentrations of 4.76 ppm and 0.07 ppm, respectively. After the regeneration treatment conducted in this manner, a second procedure of sorption and desorption treatments was undertaken in the same manner as above to obtain results that 96.9% of the cesium ions were sorbed and 95.3% thereof were desorbed while the concentrations of iron and copper were 0.24 ppm and 3.28 ppm, respectively, in the treatment solution after the sorption treatment and 3.62 ppm and 29.4 ppm, respectively, in the treatment solution after the desorption treatment.

APPLICATION EXAMPLE 2

Into an Erlenmeyer flask was taken 0.138 g of the composite sorbent resin particles prepared in Example 2 as dried, to which 10 ml of water were added and deaerated under reduced pressure by using a water jet aspirator until cease of bubble rising so as to accommodate the particles with water. Thereafter, the mixture was subjected to solid-liquid separation by filtration under reduced pressure through a membrane filter of poly(tetrafluoroethylene) resin mounted on a membrane holder of 25 mm diameter and 15 ml capacity. The composite sorbent resin particles on the membrane filter were completely washed down and transferred into an Erlenmeyer flask and the membrane holder was washed by using 10 ml of an aqueous solution containing $2 \times 10^{-3}$ mole/liter of cesium nitrate and 3 moles/liter of nitric acid and the mixture in the flask was shaken for 1 hour to effect sorption of cesium ions on the resin particles followed by filtration. The resin particles as thoroughly washed with water on the filter were completely washed down and transferred to another Erlenmeyer flask and the membrane holder was washed with 10 ml of an aqueous solution containing $10^{-3}$ mole/liter of sodium nitrite and 5 moles/liter of nitric acid and the mixture in the flask was shaken for 24 hours to effect desorption of the cesium ions from the resin particles. The filtrate and the washings were analyzed to find that 69.4% of the cesium ions in the aqueous solution were sorbed and 93.3% of the cesium ions were desorbed from the resin particles. The concentrations of iron and copper in the treatment solution after the sorption treatment were 0.07 ppm and 18.4 ppm, respectively, and the concentrations of iron and copper in the treatment solution after the desorption treatment were 4.3 ppm and 134 ppm, respectively.

In the next place, regeneration of the sorbent resin particles was undertaken by adding 10 ml of an aqueous solution containing 0.015 mole/liter of hydrazine nitrate and 0.1 mole/liter of nitric acid into the membrane holder of the membrane filter. After about 1 hour of standing, the resin particles in the membrane holder were periodically agitated until cease of bubble rising followed by standing for further 30 minutes and filtration and washing with water. The treatment solution after this regeneration treatment contained iron and copper in concentrations of 0.5 ppm and 0.72 ppm, respectively. After the regeneration treatment conducted in this manner, a second procedure of sorption and desorption treatments was undertaken in the same manner as above to obtain results that 97.6% of the cesium ions were sorbed and 95.3% thereof were desorbed while the concentrations of iron and copper were 0.13 ppm and 0.30 ppm, respectively, in the treatment solution after the sorption treatment and 2.50 ppm and 26.8 ppm, respectively, in the treatment solution after the desorption treatment.

It was noted in the results of the Application Examples 1 and 2 described above that the sorption of cesium ions in the first time sorption treatment was considerably lower than in the second time sorption treatment. This behavior was noted for all of the composite bodies of which the supported ingredient was a copper hexacyanoferrate (II) of the simple salt type in common but the sorption was high in the second time and subsequent sorption treatments.

APPLICATION EXAMPLE 3

By using 0.133 g of the composite silica gel particles prepared in Example 15 as dried, the sorption, desorption and regeneration treatments thereof were undertaken in the same manner as in Application Example 1. The results of the first time treatment tests were that: the sorption and desorption of cesium ions in the first time treatments were 88.5% and 87.1%, respectively; the concentrations of iron and copper in the treatment solution after the sorption treatment were 5.18 ppm and 37.8 ppm, respectively; and the concentrations of iron and copper in the treatment solution after desorption were 5.16 ppm and 58.3 ppm, respectively. The concentrations of iron and copper in the treatment solution after the subsequent regeneration treatment were 7.41 ppm and 0.08 ppm, respectively. On the other hand, the sorption and desorption of cesium ions in the second time treatments were 94.6% and 94.3%, respectively; the concentrations of iron and copper in the treatment solution after the sorption treatment were 0.37 ppm and 2.81 ppm, respectively; and the concentrations of iron and copper in the treatment solution after desorption were 3.56 ppm and 24.8 ppm, respectively.

APPLICATION EXAMPLE 4

By using 0.140 g of the composite sorbent resin particles prepared in Example 17 as dried, the sorption, desorption and regeneration treatments thereof were undertaken in the same manner as in Application Example 2. The results of the first time treatment tests were that: the sorption and desorption of cesium ions in the first time treatments were 98.0% and 71.1%, respectively; the concentrations of iron and copper in the treatment solution after the sorption treatment were 0.17 ppm and 2.66 ppm, respectively; and the concentrations of iron and copper in the treatment solution after desorption were 1.52 ppm and 62.0 ppm, respectively. The concentrations of iron and copper in the treatment solution after the subsequent regeneration treatment were 5.55 ppm and 0.12 ppm, respectively. On the other hand, the sorption and desorption of cesium ions in the second time treatments were 98.2% and 98.9%, respectively; the concentrations of iron and copper in the treatment solution after the sorption treatment were 0.13 ppm and 0.21 ppm, respectively; and the concentrations of iron and copper in the treatment solution after desorption were 1.73 ppm and 30.7 ppm, respectively.

It is understood from Application Examples 3 and 4, sorption of cesium ions in the first time sorption treatment can be improved by the use of a composite sorbent of the double salt-type having a copper:iron molar ratio substantially lower than 2.

APPLICATION EXAMPLE 5

Into an Erlenmeyer flask was taken 0.145 g of the composite silica gel particles prepared in Example 5 as dried, to which 10 ml of water were added and deaerated under reduced pressure by using a water jet aspirator until cease of bubble rising to accommodate the silica gel particles with water. Thereafter, the mixture was subjected to solid-liquid separation by filtration under reduced pressure through a membrane filter of poly(tetrafluoroethylene) resin mounted on a membrane holder of 25 mm diameter and 15 ml capacity. The composite silica gel particles on the membrane filter were completely washed down and transferred into an Erlenmeyer flask. In the next place, the composite silica gel particles were subjected to an oxidation treatment by using 10 ml of an aqueous solution containing $10^{-3}$ mole/liter of sodium nitrite and 5 moles/liter of nitric acid to convert the copper hexacyanoferrate (II) into copper hexacyanoferrate (III) followed by filtration and washing with water. Further, the composite silica gel particles were subjected to a reducing treatment by using 10 ml of an aqueous solution containing 0.015 mole/liter of hydrazine nitrate and 0.1 mole/liter of nitric acid. The molar ratio of copper:iron was 1.60. After filtration and washing with water, the composite silica gel particles were subjected to the sorption, desorption and regeneration treatments in the same manner as in Application Example 1. The results of the first time treatment tests were that: the sorption and desorption of cesium ions in the first time treatments were 81.5% and 92.0%, respectively; the concentrations of iron and copper in the treatment solution after the sorption treatment were 0.10 ppm and 7.39 ppm, respectively; and the concentrations of iron and copper in the treatment solution after desorption were 2.43 ppm and 30.2 ppm, respectively. The concentrations of iron and copper in the treatment solution after the subsequent regeneration treatment were 4.45 ppm and 0.01 ppm, respectively. On the other hand, the rates of sorption and desorption of cesium ions in the second time treatments were 95.8% and 92.9%, respectively; the concentrations of iron and copper in the treatment solution after the sorption treatment were 0.12 ppm and 2.81 ppm, respectively; and the concentrations of iron and copper in the treatment solution after desorption were 2.69 ppm and 22.8 ppm, respectively.

APPLICATION EXAMPLE 6

By using 0.138 g of the composite sorbent resin prepared in Example 2 as dried, a pretreatment of the resin particles was undertaken in which the copper hexacyanoferrate (II) was converted by an oxidizing treatment into copper hexacyanoferrate (III) in the same manner as in Application Example 5 followed by a reducing treatment. The molar ratio of copper:iron was 1.66. After filtration and washing with water, the resin particles were subjected to the sorption, desorption and regeneration treatments in the same manner as in Application Example 2. The results of the first time treatment tests were that: the rates of sorption and desorption of cesium ions in the first time treatments were 97.5% and 92.9%, respectively; the concentrations of iron and copper in the treatment solution after the sorption treatment were 0.36 ppm and 0.30 ppm, respectively; and the concentrations of iron and copper in the treatment solution after desorption were 3.30 ppm and 43.9 ppm, respectively. The concentrations of iron and copper in the treatment solution after the subsequent regeneration treatment were 3.74 ppm and 0.71 ppm, respectively. On the other hand, the rates of sorption and desorption of cesium ions in the second time treatments were 96.9% and 97.3%, respectively; the concentrations of iron and copper in the treatment solution after the sorption treatment were 0.18 ppm and 0.30 ppm, respectively; and the concentrations of iron and copper in the treatment solution after desorption were 2.40 ppm and 35.3 ppm, respectively.

The results of Application Examples 5 and 6 indicate that the performance of the composite sorbent supporting copper hexacyanoferrate (II) of the simple salt type can be stabilized by undertaking the pretreatment involving the oxidizing treatment under the conditions of desorption and the reducing treatment under the conditions of regeneration to accomplish an improvement that the sorption of cesium is high even in the first time sorption treatment and elution of iron and copper can be maintained relatively low.

APPLICATION EXAMPLE 7

A pretreatment of 0.319 g of the composite silica gel particles prepared in Example 1 as dried was undertaken in the same manner as in Application Example 6 excepting for the use of, as the reducing agent, 10 ml of an aqueous solution containing 0.0507 mole/liter of hydrazine nitrate and 0.1 mole/liter of nitric acid. The molar ratio of copper:iron was 1.59. After filtration and washing with water, the composite silica gel particles were completely washed down into an Erlenmeyer flask and the membrane holder was washed with 10 ml of a simulation waste solution containing $10^{-3}$ mole/liter of hydrazine nitrate, 3 moles of nitric acid and several metal salts shown in Table 1 below each in the concentration shown there and shaken for 1 hour to effect sorption of cesium ions followed by filtration and washing with water.

TABLE 1

| Metal salt | Concentration, moles/liter |
|---|---|
| Cesium nitrate | $6.00 \times 10^{-3}$ |
| Barium nitrate | $3.00 \times 10^{-3}$ |
| Strontium nitrate | $3.06 \times 10^{-3}$ |
| Zirconium nitrate | $1.06 \times 10^{-2}$ |
| Sodium molybdate | $9.42 \times 10^{-3}$ |
| Cerium nitrate | $9.42 \times 10^{-2}$ |
| Nickel nitrate | $6.63 \times 10^{-4}$ |
| Chromium(II) nitrate | $1.39 \times 10^{-3}$ |
| Iron(III) nitrate | $4.97 \times 10^{-3}$ |
| Sodium nitrate | $3.39 \times 10^{-1}$ |
| Copper(II) nitrate | $3.00 \times 10^{-3}$ |

In the next place, the silica gel particles were completely washed down into another Erlenmeyer flask and the membrane holder was washed with 10 ml of an aqueous solution containing $10^{-3}$ mole/liter of sodium nitrite and 5 moles/liter of nitric acid and shaken for 24 hours to effect desorption of the cesium ions. Thereafter, a regeneration treatment was undertaken under the same conditions as in Application Example 1 excepting for the use of, as the regenerating agent, 10 ml of an aqueous solution containing 0.0507 mole/liter of hydrazine nitrate and 0.1 mole/liter of nitric acid followed by second time sorption and desorption treatments in the same manner as above. The rates of sorption and desorption of the cesium ions were 77.5% and 93.5%, respectively, in the first time treatments and 79.2% and 93.8%, respectively, in the second time treatments.

What is claimed is:

1. A method for the preparation of a cesium-separating sorbent which comprises the steps of:
    (a) impregnating pores of a porous carrier material which is a silica gel or a porous (meth)acrylic adsorbent resin with a water-soluble hexacyanoferrate (II), which is potassium hexacyanoferrate (II) or sodium hexacyanoferrate (II); and
    (b) bringing the carrier material supporting the water-soluble hexacyanoferrate (II) into contact with a solution of a copper salt dissolved in methyl alcohol or ethyl alcohol so as to deposit an insoluble copper hexacyanoferrate (II) within the pores of the porous carrier material.

2. The method for the preparation of a cesium-separating sorbent as claimed in claim 1 in which the porous carrier material has a pore volume of at least 0.7 ml/g and the pore diameter thereof is in the range from 3 to 80 nm.

3. The method for the preparation of a cesium-separating sorbent as claimed in claim 1 in which the porous carrier material is impregnated with the water-soluble hexacyanoferrate (II) by bringing said porous carrier material into contact with an aqueous solution of the water-soluble hexacyanoferrate (II) followed by dehydration.

4. The method for the preparation of a cesium-separating sorbent as claimed in claim 3 in which the aqueous solution is substantially saturated with the water-soluble hexacyanoferrate (II).

5. The method for the preparation of a cesium-separating sorbent as claimed in claim 1 in which the copper salt is copper(II) chloride or copper(II) nitrate.

6. The method for the preparation of a cesium-separating sorbent as claimed in claim 1 in which the solution of the copper salt contains the copper salt in an amount of at least 1.5 moles per mole of the water-soluble hexacyanoferrate (II) impregnating the porous carrier material.

7. The method for the preparation of a cesium-separating sorbent as claimed in claim 1 in which the concentration of the copper salt in the solution is in the range from 0.1 to 1 mole/liter.

8. A method for the preparation of a cesium-separating sorbent which comprises the steps of:
    (a) impregnating pores of a porous carrier material which is a silica gel or a porous (meth)acrylic adsorbent resin with a water-soluble hexacyanoferrate (III), which is potassium hexacyanoferrate (III) or sodium hexacyanoferrate (III);
    (b) bringing the carrier material supporting the hexacyanoferrate (III) into contact with a solution of a copper salt dissolved in methyl alcohol or ethyl alcohol so as to deposit an insoluble copper hexacyanoferrate (III) within the pores of the porous carrier material; and
    (c) subjecting the insoluble copper hexacyanoferrate (III) deposited within the pores of the porous carrier material to a reducing reaction so as to convert the insoluble copper hexacyanoferrate (III) into a copper hexacyanoferrate (II).

9. The method for the preparation of a cesium-separating sorbent as claimed in claim 8 in which the porous carrier material has a pore volume of at least 0.7 ml/g and the pore diameter thereof is in the range from 3 to 80 nm.

10. The method for the preparation of a cesium-separating sorbent as claimed in claim 8 in which the porous carrier material is impregnated with the water-soluble hexacyanoferrate (III) by bringing said porous carrier material into contact with an aqueous solution of the water-soluble hexacyanoferrate (III) followed by dehydration.

11. The method for the preparation of a cesium-separating sorbent as claimed in claim 10 in which the aqueous solution is substantially saturated with the water-soluble hexacyanoferrate (III).

12. The method for the preparation of a cesium-separating sorbent as claimed in claim 8 in which the copper salt is copper(II) chloride or copper(II) nitrate.

13. The method for the preparation of a cesium-separating sorbent as claimed in claim 8 in which the solution of the copper salt contains the copper salt in an amount of at least 1.5 moles per mole of the water-soluble hexacyanoferrate (III) impregnating the porous carrier material.

14. The method for the preparation of a cesium-separating sorbent as claimed in claim 8 in which the concentration of the copper salt in the solution is in the range from 0.1 to 1 mole/liter.

15. The method for the preparation of a cesium-separating sorbent as claimed in claim 8 in which the reducing reaction is conducted by bringing the porous carrier material supporting the copper hexacyanoferrate (III) into contact with an aqueous solution of a reducing agent.

16. The method for the preparation of a cesium-separating sorbent as claimed in claim 15 in which the aqueous solution is an aqueous solution containing hydrazine nitrate.

* * * * *